United States Patent
Hiron et al.

(10) Patent No.: US 8,291,447 B2
(45) Date of Patent: Oct. 16, 2012

(54) METHOD FOR DISPLAYING AUDIOVISUAL SEQUENCES AT RECEIVER LEVEL AND RECEIVER FOR DISPLAYING SAID SEQUENCES

(75) Inventors: Franck Hiron, Chateaubourg (FR); Yves Maetz, Melesse (FR)

(73) Assignee: Thomson Licensing, Boulogne-Billancourt (FR)

(*) Notice: Subject to any disclaimer, the term of this patent is extended or adjusted under 35 U.S.C. 154(b) by 261 days.

(21) Appl. No.: 11/629,924

(22) PCT Filed: Jun. 28, 2005

(86) PCT No.: PCT/EP2005/053024
§ 371 (c)(1),
(2), (4) Date: Dec. 18, 2006

(87) PCT Pub. No.: WO2006/010685
PCT Pub. Date: Feb. 2, 2006

(65) Prior Publication Data
US 2007/0256090 A1    Nov. 1, 2007

(30) Foreign Application Priority Data

Jun. 30, 2004   (FR) ..................................... 04 07250

(51) Int. Cl.
*H04H 20/14*   (2008.01)
*H04N 7/10*   (2006.01)
*G06F 3/00*   (2006.01)
(52) U.S. Cl. ................ 725/22; 725/32; 725/34; 725/36; 725/42; 725/46
(58) Field of Classification Search .................... 725/32, 725/34–36, 42, 44, 46
See application file for complete search history.

(56) References Cited

U.S. PATENT DOCUMENTS

| 5,848,397 | A | * | 12/1998 | Marsh et al. .................... 705/14 |
| 6,446,261 | B1 | * | 9/2002 | Rosser ............................ 725/34 |
| 6,698,020 | B1 | * | 2/2004 | Zigmond et al. ................ 725/34 |

(Continued)

FOREIGN PATENT DOCUMENTS

EP    1263224    12/2002
(Continued)

OTHER PUBLICATIONS

Search Report Dated Oct. 31, 2005.

*Primary Examiner* — Jason Salce
*Assistant Examiner* — Gigi L Dubasky
(74) *Attorney, Agent, or Firm* — Robert D. Shedd; Jeffrey M. Navon

(57) ABSTRACT

The invention relates to a method for displaying audiovisual sequences, typically advertisements, carried out by a device provided with means for the reception and recording of said sequences. A display scenario is sent to the device. Said scenario comprises groups of data made up of sequence identifiers and at least one time display window. Following the reception of a signal which typically announces an advertising spot, the device selects a sequence whose associated time display window includes the present moment and displays it. Usual behavior of the user is stored by the device which plans the display of said sequences when the user is not normally present during the planned time window.
In an advanced form, the time window is broken down into periods and the scenario specifies a number of displays of the sequence during said period.
The invention also relates to a device which can receive a scenario and run it in order to select sequences and display them according to the display method.

17 Claims, 4 Drawing Sheets

U.S. PATENT DOCUMENTS

Figure 1:
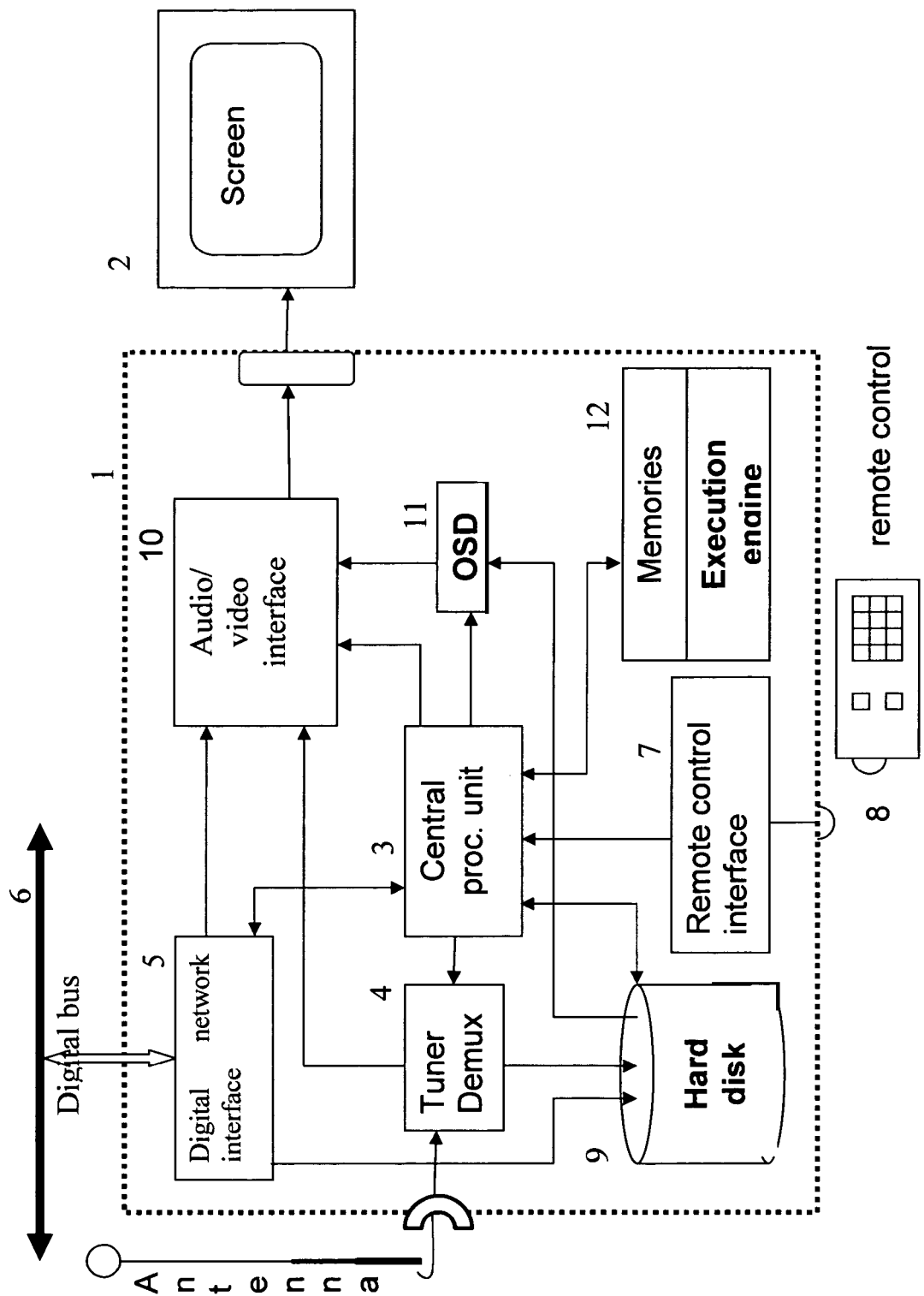

| | | |
|---|---|---|
| 2001/0042249 A1 | 11/2001 | Knepper et al. |
| 2002/0083435 A1* | 6/2002 | Blasko et al. ............. 725/14 |
| 2002/0083439 A1* | 6/2002 | Eldering ............. 725/32 |
| 2002/0129362 A1 | 9/2002 | Chang et al. |
| 2002/0129368 A1* | 9/2002 | Schlack et al. ............. 725/46 |
| 2002/0184047 A1* | 12/2002 | Plotnick et al. ............. 705/1 |
| 2003/0079226 A1 | 4/2003 | Barrett |
| 2007/0011051 A1* | 1/2007 | Findlay et al. ............. 705/14 |

FOREIGN PATENT DOCUMENTS

| | | |
|---|---|---|
| JP | 2003224843 A | 8/2003 |
| JP | 2003242069 A | 8/2003 |
| JP | 2003289518 A | 10/2003 |
| JP | 2003308270 A | 10/2003 |
| JP | 2005197986 A | 7/2005 |
| WO | 04002156 A | 12/2003 |
| WO | WO 2006/010685 | 2/2006 |

* cited by examiner

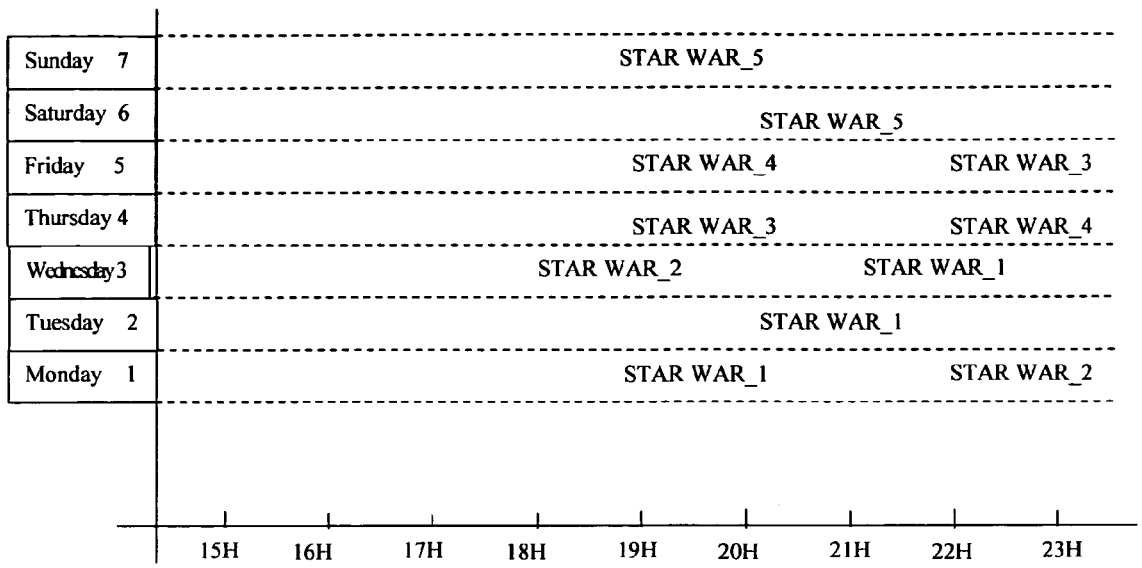

STAR WAR_1: Document from which the title of the film cannot be worked out
STAR WAR_2: Document from which the title of the film cannot be worked out, to be broadcast alternately with STAR WAR_1
STAR WAR_3: Document from which the title of the film cannot be worked out, but showing a scene from the film
STAR WAR_4: Document showing the title of the film, with another scene from the film
STAR WAR_5: Document showing the title of the film, with the trailor

Fig. 2a

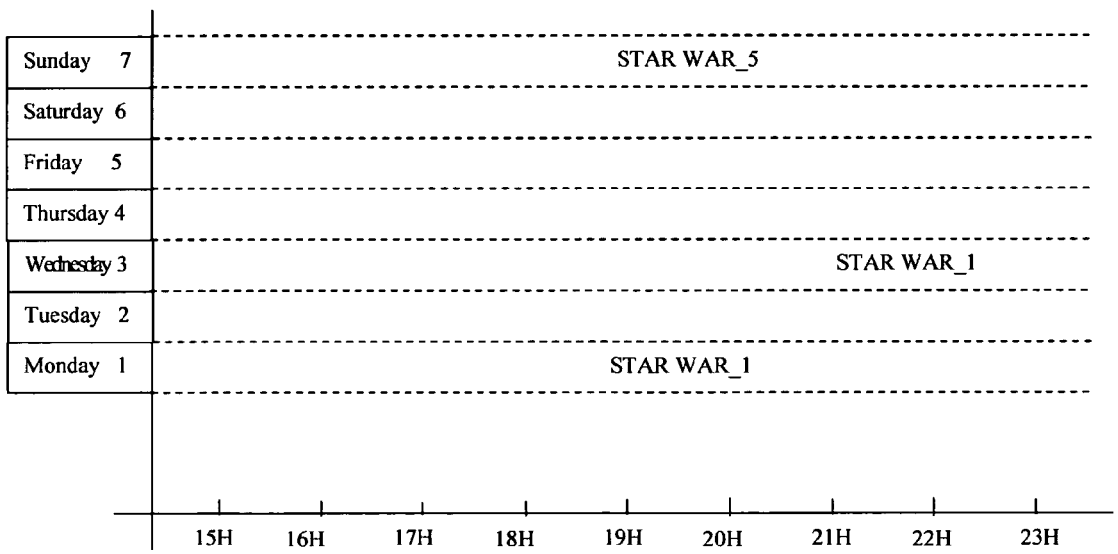

STAR WAR_1: Document from which the title of the film cannot be worked out
STAR WAR_2: Document from which the title of the film cannot be worked out, to be broadcast alternately with STAR WAR_1
STAR WAR_3: Document from which the title of the film cannot be worked out, but showing a scene from the film
STAR WAR_4: Document showing the title of the film, with another scene from the film
STAR WAR_5: Document showing the title of the film, with the trailor

Fig. 2b             (display according to prior art)

METHOD FOR DISPLAYING AUDIOVISUAL SEQUENCES AT RECEIVER LEVEL AND RECEIVER FOR DISPLAYING SAID SEQUENCES

This application claims the benefit, under 35 U.S.C. §365 of International Application PCT/EP2005/053024, filed Jun. 28, 2005, which was published in accordance with PCT Article 21(2) on Feb. 2, 2006 in French and which claims the benefit of French patent application No. 04/07250, filed Jun. 30, 2004.

The invention relates to a method for displaying audiovisual sequences by a receiver, and a receiver capable of displaying them. The invention relates more particularly to the display of trailers associated with a certain event or a product that is to be launched.

These days, numerous events are preceded by an advertising campaign. The event can be, for example, the general release of a film, the launch of a new car or the placement on the broadcast network of a particularly interesting audiovisual content. Another type of advertising campaign consists in staging a product or reviewing the features of a product. Normally, the advertisers develop a genuine scenario for gradually arousing the interest of the consumer in the product that is the subject of the advertising campaign. Physically, an advertising campaign is made up of a number of advertising sequences (or advertising screens) following each other chronologically up to the product launch date or the date when the product is placed on the market.

In the field of audiovisual programs, the users are provided with devices for displaying audiovisual programs broadcast from a broadcast network or downloaded from a broadband digital network. Devices that allow very long program times to be recorded are becoming increasingly commonplace. These resources are, for example, the DVD player/recorder (or DVD-RAM), or hard disk drive (HDD). These resources make it possible to record audiovisual programs received in real time from a broadcast network, and play them back on demand.

When the advertising campaign is conducted over a broadcast network, the broadcaster will program the display of the sequences at predetermined moments according to the wishes of the advertiser. He cannot, however, predict the behavior of the user of the display device. For example, the user may be an occasional viewer who switches on his device very rarely and who will thus see only some of the advertising sequences of the campaign. If we assume that the campaign is made up of five chronological advertising sequences, an occasional user might see only sequences 1, 2 and 5, so the advertising campaign would appear to him to be poorly organized. At worst, if he records the audiovisual programs in his device, he risks seeing the sequences in an order different from that planned by the advertiser.

One advantage of the present invention is to assure the advertiser that the user will watch an advertising scenario that is as close as possible to that planned by the advertiser. Furthermore, the present invention can optimize the coverage and impact of an advertising campaign oriented towards a product, a specific event or a program, whose broadcast is to be announced in advance, by adapting the display of the advertising sequences to the display habits of the user.

The document EP 1 263 224 discloses a method for controlling the appearance of advertisements on screen. The advertisements are stored in the receiver. According to this prior art, a priority is associated with each advertising sequence enabling them to be selected at the time of display. The selection is triggered by a signal transmitted by the broadcast network, comprising a display command, an erase command, an application control command, an advertising sequence identifier. In this way, the display of the advertising sequence is controlled only by the received scenario and by the broadcaster signals. Account is not therefore taken of the habits of the user and in particular the fact that he is not watching his television during the times planned in the scenario.

One subject of the present invention is a method for displaying audiovisual sequences, preferably of advertising type, on a device of a user, the transmissions being transmitted in advance by a broadcaster and displayed at predetermined times by the broadcaster and modified in a way planned by the broadcaster according to device-specific criteria. In this way, an advertiser can be assured that a scenario will be conducted correctly regardless of the behavior of the user. For example, it is possible to guarantee that all the audiovisual contents have been seen at least once. Thus, the coverage and impact of the advertising contents are optimized thanks to the individual context of each user. The invention also makes it possible for advertisers to have a new means of broadcasting their advertising messages.

The invention proposes a method for displaying audiovisual sequences by a device provided with a means of receiving and recording said sequences; characterized in that it comprises the following steps:

reception of a display scenario comprising groups of data combining at least one sequence identifier with at least one time display window associated with a sequence, a step for compiling device usage data, and, following the reception of a trigger indication originating from a broadcast network:

selection of at least one sequence before at least one associated time display window when the device is not normally used during said time window, display of the or each selected sequence(s).

With an intelligent scheduling performed locally, the event or the product being announced will have a better penetration and a greater effectiveness for each user. The obligation for the user to display concomitantly audiovisual programs selected by the user and programmed advertising sequences is based on a scenario defined by the advertiser originating these sequences. Thus, by using the above method, a user can purchase from a distributor a device capable of searching for and displaying advertising messages, the purchase being made with a cost reduction thanks to the prospective rights corresponding to the messages that will be displayed by this device. The device updates device usage data and can thus know the habits of the user. In this way, a sequence can be selected and displayed before the time window indicated in the scenario if the usage data shows that the device is not normally used during the time window defined in the scenario. This makes it possible to anticipate the absences of the user and to show him certain sequences earlier than planned in the scenario.

According to a refinement, the time display window is divided into a plurality of periods such as days. The displays during these periods are counted and, if a maximum number of displays per period is reached, then the associated sequence is no longer displayed. In this way, a large number of displays of one and the same sequence can be spread over several periods.

According to another refinement, at least two sequences are associated with a maximum number of displays and at least one time display window. The sequences are selected alternately when the present moment falls within the associated time window and if the display counter has not reached the maximum number of displays. In this way, the user will not see the same advertising sequence twice in succession. According to another refinement, the order of associated sequences is defined randomly.

According to another refinement, a priority value is associated with the sequences, the sequence having the highest priority being selected and displayed first. Thus, the advertiser can give priority to the display of certain sequences in preference to other sequences.

According to another refinement, a sequence can be selected and displayed after the time window indicated in the scenario if the number of displays of this sequence has not reached a minimum value. In this way, if the user has missed sequences because of his absence, the method can impose the display of sequences that should already have been viewed.

According to another refinement, the number of displays of each sequence is transmitted outside the device when the last time window defined in the scenario is ended. In this way, the advertisers can know the quantity of messages seen and the number of users hit by the messages, and thus deduce the impact of the advertising campaign.

According to another refinement, the user enters his identifier. With this identifier, the selection of the sequences and the counting of the displays are performed independently for each user. Thus, consumers who use the same device at different times can see scenarios compliant with the programming of the advertiser.

The invention also proposes a receiver of audiovisual transmissions comprising a means of receiving audiovisual sequences such as advertising sequences, a means of sending display signals, characterized in that it comprises a means of receiving a display scenario comprising groups of data combining at least one sequence identifier with at least one associated time display window, a means of compiling device usage data, a means of selecting at least one sequence before an associated time display window when the device is not normally used during said time window, said selection means being activated following the reception of a sequence display trigger indication originating from a broadcast network, the signals of the selected sequences being transmitted by the receiver for display.

Figure 3:
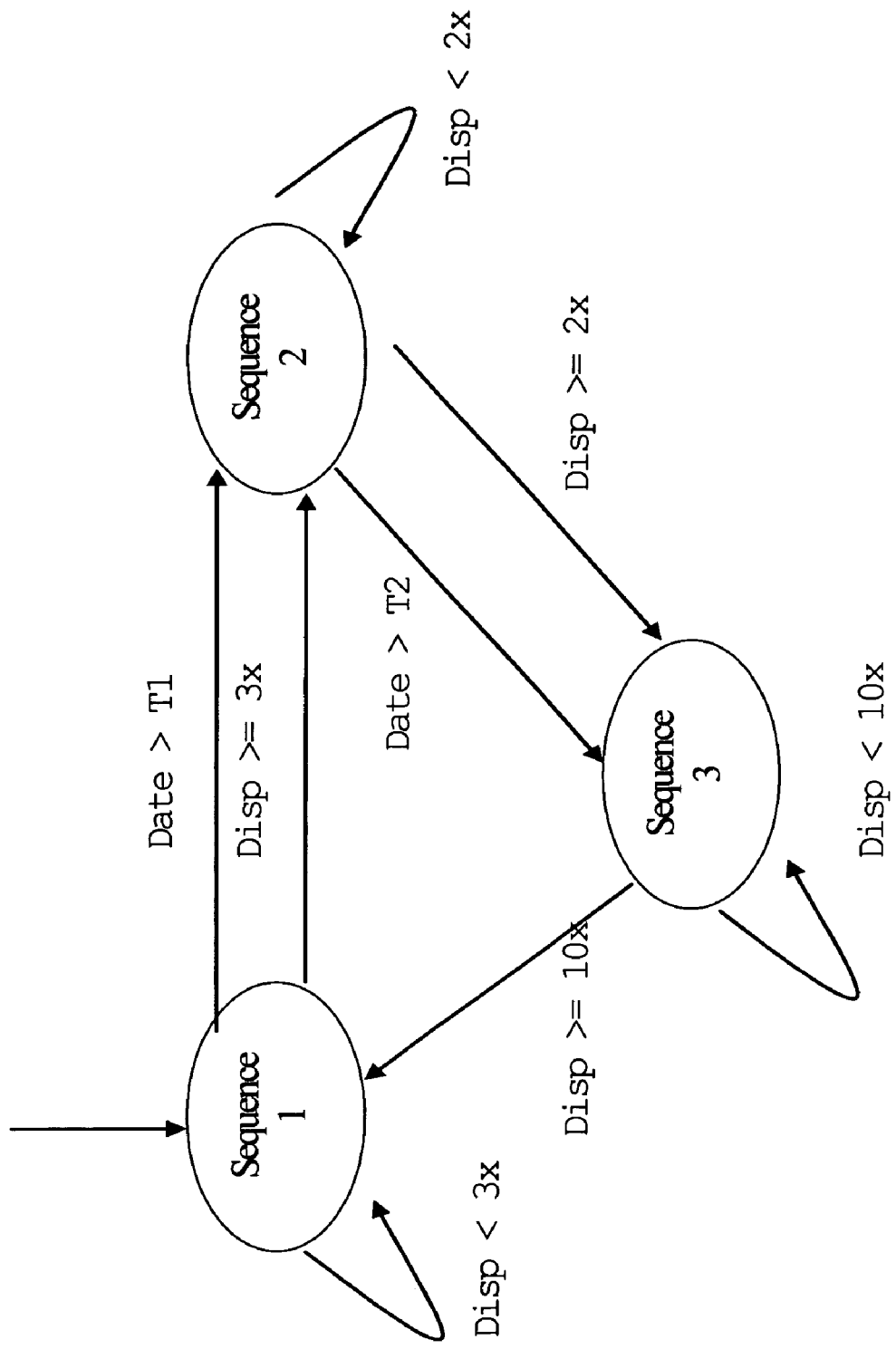
Figure 4:
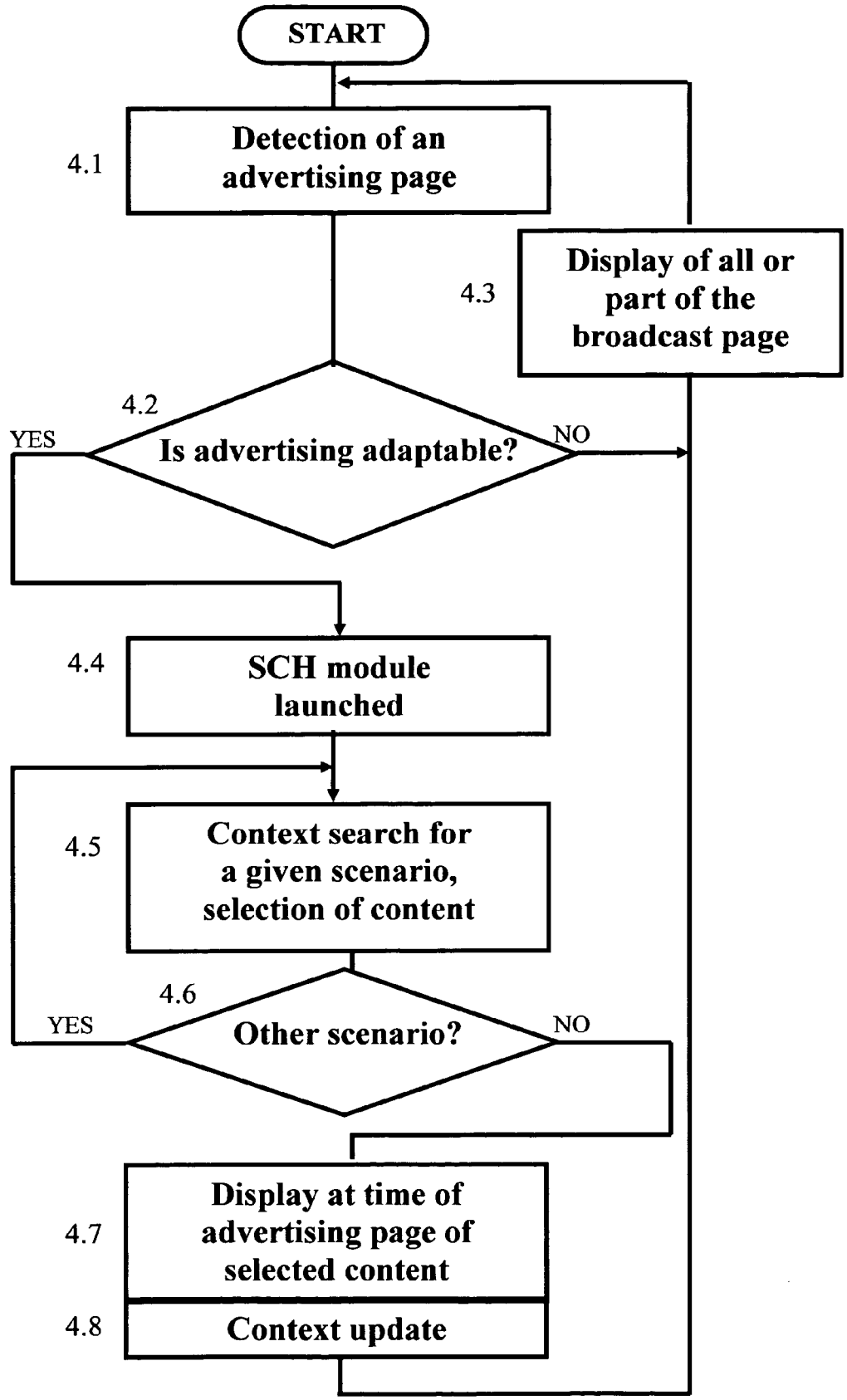

The present invention will now emerge with more detail in the following description of exemplary embodiments, given for illustration, referring to the appended figures which represent:

FIG. 1, a block diagram of an audiovisual receiver for implementing the invention, FIGS. 2a and 2b, an exemplary scenario sent by a broadcaster and actually displayed to a user according to the prior art, FIG. 3, a finite state machine illustrating the execution of the SCH module according to a given scenario, FIG. 4, a flow diagram of execution of the SCH module.

The operation of an audiovisual receiver 1 provided with a display device 2 will first of all be described with the help of FIG. 1. The receiver comprises a central processing unit 3 linked to a program (ROM) and working (RAM) memory 12, and an interface 5 for communication with a high speed local digital bus 6 enabling audiovisual data to be transmitted in real time. This network is, for example, an IEEE 1394 network. This digital bus can also be used to send data to a server. The receiver can also receive audio/video data from a broadcast network via a receive antenna associated with a demodulator 4. The receiver further comprises a receiver of infrared signals 7 for receiving signals from a remote control 8, a storage means 9 for storing audiovisual contents, and an audio/video decoding logic 10 for generating the audiovisual signals sent to the television screen 2. The nature of the audiovisual transmissions is digital, so the storage means 9 is preferably a hard disk drive (HDD), but it can also be a rewritable optical disk player/recorder (DVD-RAM).

The receiver also has a clock (not shown) making it possible to synchronize displays at moments planned by the content provider.

The receiver also comprises a circuit 11 for displaying data on the screen, often called an OSD (on-screen display) circuit. The OSD circuit 11 is a text and graphics generator which can be used to display on screen menus, pictograms (for example, a number corresponding to the channel being viewed), or enabling two audiovisual contents to be mixed. The OSD circuit is in particular controlled by the central processing unit 3 associated with an executable module called "Scheduler". The scheduler, or SCH for short hereinafter in the document, typically comprises a ROM-resident program module 12 and parameters stored in working memory. The SCH module can also be implemented in the form of an ASIC type custom circuit, for example.

We will first explain how an advertising campaign is broadcast. The broadcaster transmits adverts at predetermined times. He knows statistically the population segment likely to be watching the television at this moment, but cannot in any way target an individual. The broadcaster can define an optimal scenario according to the habits of an average population of users, but cannot in any way guarantee that all will be satisfied. Let us assume, for example, that the advertising campaign is for the film "Star Wars" and that this campaign has five different audiovisual contents (or commercials), identified: STAR WAR1, STAR WAR2, . . . STAR WAR5. These contents must be broadcast during the week preceding the broadcasting of the film or its general release. In the scenario represented by FIG. 2a, the broadcaster begins on Monday by broadcasting STAR WAR1 at 19 h00 and STAR WAR2 at 22 h00. Then, over the week, the audiovisual contents evolve to arouse the interest of the user. For example, the STAR WAR1 content shows a few pictures from the film but the title cannot be worked out from it. The STAR WAR2 content shows other pictures from the film without allowing its title to be worked out (STAR WAR1 and STAR WAR2 are designed to be displayed alternately). The STAR WAR3 content shows scenes from the film with the main actors but the title cannot be worked out from it. The STAR WAR4 content shows major scenes and the title of the film. STAR WAR5 is the trailer of the film.

Based on this known procedure, let us now analyze what actually happens at the home of a user and illustrate it with an example. Consider a user who is often away from home, FIG. 2b shows what will actually be displayed. The user is away on Tuesday, Thursday, Friday and Saturday. Because of this, he sees only three contents: STAR WAR1 on Monday at 19 h00, STAR WAR1 again on Wednesday at 21 h00 and STAR WAR5 on Sunday. Therefore, the user does not see the intermediate sequences STAR WAR2, STAR WAR3, STAR WAR4. The display of these sequences does not in any way correspond to the scenario of the advertiser, and the interest of the user will not be gradually aroused as the advertiser wishes.

The present invention makes it possible to solve this problem by customizing the display of an advertising campaign by adapting it to the habits of the user. The SCH module monitors the display of the sequences, these sequences being audiovisual contents to be presented to the user at predetermined times. To calculate the display time, the SCH module uses a television receiver usage context. The context is a block of data updated locally in the working memory (RAM) of the receiver, and can contain the following data:

average usage time of the receiver, probable time bands when the receiver will be used, number and identifier of the sequences of the campaign, time bands of the sequences already displayed.

The first part which concerns the habits of the user of the context can be extracted from a user profile managed by another module. Another possible method consists in creating a table in working memory defining, for each day of the week, the average time and the probable display time bands. Below is an example of such a table:

TABLE 1

| Day | Average usage time | Probable usage time bands |
| --- | --- | --- |
| Monday | 1 h 34' | [19:32-20:15] |
| Tuesday | 1 h 23' | [19:28-20:19] |
| Wednesday | 2 h 10' | [16:32-17:16]; [19:45-20:52] |
| Thursday | 0 h 56' | [19:45-20:15] |
| Friday | 3 h 15' | [18:50-21:23] |
| Saturday | 4 h 15' | [12:15-13:26]; [19:53-21:15] |
| Sunday | 2 h 10' | [20:32-22:15] |

The data in table 1 is updated daily by a software module which reads a clock and deduces from it the usage data for the receiver. One method consists in using a rolling four-week time window and calculating, day after day, the habits of the user. According to a refinement, the context takes into account the channel or the service selected by the user. In this case, the data in the above table is duplicated in as many tables as there are channels or services that can be accessed by the receiver. According to another refinement, the receiver includes in memory as many tables defining a context as there are users of the receiver. According to this refinement, a user is identified on switching on his receiver and the SCH module then takes account of the table associated with this user. We will see below where the data of the second part of the context, concerning the state at the present instant of the advertising campaign, is stored.

Initially, the receiver receives a block of information defining a set of rules that will be used in the receiver to create an advertising contents broadcasting scenario. This block is made up of one or more identified contents, and a block of data associated with a minimum/maximum number of displays of the contents and/or predetermined times for their displays. As a variant, the block of information contains rules and links that can be used to download the advertising contents, in which case the storage is remote and the receiver does not need a large storage capacity. The search for contents is performed, for example, via a broadband link connected to the Internet.

Below is an example of a block of data defining the display rules for a plurality of five audiovisual contents according to a simplified embodiment of the invention, each line in the table being considered as a rule:

TABLE 2

(general data defining the advertising scenario)

| Audiovisual content identifier | Programmed number of occurrences | Programmed display windows |
| --- | --- | --- |
| STAR WAR1 | 1 to 10 times | Monday 24/5, Tuesday 25/5 |
| STAR WAR2 | 1 to 5 times | Tuesday 25/5, Wednesday 26/5 |
| STAR WAR3 | 1 to 4 times | Thursday 27/5 |
| STAR WAR4 | 2 to 6 times | Friday 28/5, Saturday 29/5 |
| STAR WAR5 | 2 to 4 times | Saturday 29/5, Sunday 30/5 |

The general data can in particular comprise:

the identifier of the audiovisual event that is the subject of the scenario, and in particular the final moment of the campaign (that is, the limit date and time when no more content will be displayed on the receivers), the identifier of the channel(s) or service(s) that can display the contents, this information does not preclude a predetermined advertising campaign from being able to be displayed regardless of the channel or service selected by the user, the duration of the campaign, in the example a week, the seven days being denoted D1, D2, . . . D7, the number of audiovisual contents.

The content area comprises lines identified by one or more combined contents. The advertiser has defined for each line the number of occurrences and the time window(s) planned for displaying the content(s) identifying the line. The programmed number of occurrences is the number of times that the advertiser orders the SCH module to display the associated content during the display time band defined in the third column. For example, the STAR WAR1 content must be displayed between one and ten times in the time band from Monday May 24 to Tuesday May 25.

Table 2 defines an exemplary scenario. The execution of a scenario can be represented by a finite state machine. An exemplary finite state machine is given in FIG. 3. There is a transition from one state to another if a date has expired or when the number of displays is reached. This way of expressing things provides the greatest flexibility for definition, and makes it possible in particular to define any order in the series of sequences. The finite state machine represents an "ideal display scenario", it can be extremely complex if the scenario includes many rules.

The display time band associated with a content determines the moment when the advertiser again orders the SCH module to display the associated content. This time band can be defined by one or more days, but the advertiser can define it more finely using time bands by specifying start and end times for each day.

According to a first refinement, the advertiser can link two contents and decide to display them alternately. For example, a line of the scenario specifies that STAR WAR1 and STAR WAR2 must be displayed alternately on Tuesday. This specific feature is defined in a new line of table 2 identified by two combined content identifiers comprising the following data:

| | | |
| --- | --- | --- |
| STAR WAR1, STAR WAR2 | 1 to 3 alternating cycles | Thursday 27/5 |

Simply, the SCH module selects the contents according to the order of the list of identifiers defined in the line, and this way the advertiser himself indicates the first content displayed, then the second, and so on. According to a refinement, the advertiser indicates by a flag that the order of display of the contents identified can be random.

The block of the advertising scenario is stored in working memory and immediately administered by the SCH module. Several advertising scenarios can be carried out at the same time, each scenario being defined by its own block of data, and therefore each scenario concerns audiovisual contents that are preferably separate. The stored block contains other data relating to the number of times when the content has been played back, and the playback times. Table 3 below shows the state of a stored block containing data concerning the campaign defined by table 2 and dated May 26 at 19:00:

TABLE 3

(general data defining the advertising scenario stored in receiver memory)

| Identifier | Programmed number of occurrences | Display windows | Actual number of occurrences | Date and time of occurrences |
|---|---|---|---|---|
| STAR WAR1 | 1 to 10 times | 24/5, 25/5 | 3 | 24/5: 19:27, 24/5: 2:45, 25/5: 18:15 |
| STAR WAR2 | 1 to 5 times | 25/5, 26/5 | 2 | 25/5: 18:26, 26/5: 18:56 |
| STAR WAR3 | 1 to 4 times | 27/5 | 0 | |
| STAR WAR4 | 2 to 6 times | 28/5, 29/5 | 0 | |
| STAR WAR5 | 2 to 4 times | 29/5, 30/5 | 0 | |

It can be seen from the table data that the SCH module was able to display the STAR WAR1 content three times, during three advertising time bands. The STAR WAR2 content was displayed twice. Since the current date is May 26, when the next advertising time band is announced, the SCH module will select the STAR WAR2 content. The other contents are programmed on subsequent days by the advertiser, the associated occurrence counters therefore have a zero value. The actual number of occurrences, the date and time of display of the contents constitute what was previously called the second part of the context which concerns the state at the present moment of the advertising campaign.

Now let us look at how the SCH module works. The user switches on his receiver, the SCH module is automatically launched and analyzes the scenario blocks already recorded. The user selects a channel or a service and the display begins. Depending on the channel or service selected, the SCH module creates the list of scenario blocks concerned. If no block has contents that can be displayed on the selected channel or service, the SCH module can be disconnected until the next change of channel or the next time the receiver is switched on. Once the list of blocks has been created (the blocks are said to be activated), the SCH module is awaiting the broadcast of the next adaptable advertising time band. The qualifier "adaptable" expresses the fact that the advertising contents displayed are adapted to the user. The choice of content is made according to:

the current time and date,
the number of displays already made for each content,
the context linked to the user and to the selected channel or service,
where appropriate, the priorities assigned to the contents.

When an adaptable time band defined by the broadcaster of the channel or service is announced, the SCH module determines the content or contents that will be displayed. This announcement signal is placed in a proprietary field of a descriptor of a DVB-SI table. The announcement signal contains the exact moment when the advertising time band starts and, where appropriate, the time allotted for the adaptable advertising. When such a signal is detected, the SCH module analyzes its context and, depending on the rules of the scenario, deduces the sequence to be displayed. This calculation can be made very quickly and the user notices only that the advertising sequence is not the one broadcast on the selected channel but a content that the receiver has just fetched. For a block defining a scenario, the SCH module selects a single content to be displayed.

At the indicated advertising time band start time, the SCH module switches the display from the reception means to the hard disk to read in turn the audiovisual content selected previously. If a number of scenarios are activated, the SCH module can display several contents in turn. Once all the selected contents have been displayed, and if there is still advertising band time remaining, the SCH module can switch to the reception means to display the end of the advertising time band broadcast by the service selected by the user. Advantageously, the hard disk is used to delay the transmissions a little in order not to cut advertising sequences.

The flow diagram in FIG. 4 illustrates how the SCH module operates. The first step (4.1) consists in detecting the announcement of the broadcast of an advertising page. The receiver determines in the step 4.2 whether it is an adaptable advertising page. This is done by detecting the descriptor(s) associated with this page, a flag being used to differentiate a "normal" advertising sequence from an "adaptable" advertising sequence. If it is not an adaptable advertising page, the advertising contents broadcast and received will be displayed unchanged, that is, all the broadcast advertising time band (step 4.3). If it is an adaptable advertising page, then the SCH module is launched (step 4.4). In the step 4.5, the SCH module searches for the context for a given scenario and, depending on this context, selects a content. Then, the SCH module tests to see if other scenarios corresponding to another advertiser in the advertising page are activated (step 4.6). If such is the case, the module once again skips to the step 4.5 to look for another content to be displayed. The module loops on steps 4.5 and 4.6 until there are no more scenarios to be analyzed. The selected contents are then displayed when the advertising page is programmed (step 4.7), after which, the SCH module updates the display context of the contents (step 4.8) by incrementing the counters associated with the audiovisual contents that have been displayed. Then, the module skips to the display of the broadcast page (step 4.3), to finish (if there is still time remaining) displaying the broadcast advertising page. It can thus be seen that the normal advertisements (that is, advertisements according to the prior art) can be found with adaptable advertisements in an advertising page. To synchronize the contents extracted from memory and broadcast, it is possible to use a slight deferment by temporarily storing the data received from the broadcast network.

It is in the interest of the advertiser to define a minimum and maximum limit for the number of occurrences because the actual number of displays depends on the usage time of the receiver. If the user does not use his receiver, the minimum number of occurrences programmed is not reached. The SCH module recognizes this situation by the fact that, for a given day, the actual number of occurrences is less than the programmed number of occurrences. A simple solution consists in continuing the advertising campaign in accordance with the instructions given by the advertiser.

A refinement consists in forcing the display of a content at a time not programmed by the advertiser when the minimum number of occurrences programmed is not reached. Table 4 illustrates such a situation. Table 4 below shows the state of a stored block containing data relating to the campaign defined by table 2 and on the date of May 28 at 19:00:

TABLE 4

(general data defining the advertising scenario stored on the receiver)

| Identifier | Programmed number of occurrences | Display windows | Actual number of occurrences | Date and time of occurrences |
|---|---|---|---|---|
| STAR WAR1 | 1 to 10 times | 24/5, 25/5 | 3 | 24/5: 19:27 24/5: 2:45, 25/5: 8:15 |
| STAR WAR2 | 1 to 5 times | 25/5, 26/5 | 2 | 25/5: 8:26 26/5: 8:56 |
| STAR WAR3 | 1 to 4 times | 27/5 | 0 | |
| STAR WAR4 | 2 to 6 times | 28/5, 29/5 | 0 | |
| STAR WAR5 | 2 to 4 times | 29/5, 30/5 | 0 | |

After powering up or on announcing an imminent broadcast of an advertising band, the SCH module analyzes the data in the table, and notes that the STAR WAR1 and STAR WAR2 contents have been displayed a number of times corresponding to the scenario of the advertiser, but that the STAR WAR3 content was not displayed on May 27 as planned. The date is now May 28, so it is too late according to the scenario of the advertiser. Since the minimum number of occurrences of STAR WAR3 has not been reached, the SCH module decides to give priority to selecting STAR WAR3 in the next display time band, that is, on May 28 (if the user watches programs on that day). In this way, to comply in part with the scenario, the STAR WAR3 content will be displayed at least once. The STAR WAR4 content can then be displayed as programmed by the broadcaster. Generally, the SCH module gives priority to displaying a sequence for which the minimum number of occurrences has not been reached and for which all the dates programmed by the advertiser are passed.

In this way, the scheduling of the contents is correctly observed and the user sees at least once the contents in the order programmed by the advertiser. The SCH module can thus later restore a scheduling.

According to another embodiment variant, the SCH module will take into account index data to anticipate a situation where the programmed displays run the risk of not being made, so that, by displaying the contents before the programmed display date, the scheduling is respected. By analyzing the context, the SCH module can see that a user never uses his receiver on a certain day of the week, but the advertiser has programmed contents for these days. To take an example of a first context part which concerns the habits of the user, it can be seen that, after a certain time, this user does not use his receiver on Wednesdays and Thursdays:

TABLE 5

| Day | Average usage time | Probable usage time bands |
|---|---|---|
| Monday | 1 h 34' | [19:32-20:15] |
| Tuesday | 2 h 23' | [18:28-19:45]; [20:30-21:30] |
| Wednesday | 0 h 00 | — |
| Thursday | 0 h 00 | — |
| Friday | 3 h 15' | [18:50-21:23] |
| Saturday | 4 h 15' | [12:15-13:26]; [19:53-21:15] |
| Sunday | 2 h 10' | [20:32-22:15] |

Given the above usage data, the SCH module then decides that if a block defining a scenario contains a content to be displayed on a Wednesday, this content can be played back on the preceding Tuesday. On Tuesday, the SCH module begins by displaying the contents actually programmed for that day. Then, for example one hour before the end of the probable usage time band (that is, 20:30 according to the data in table 5), the SCH module displays the contents programmed for the Wednesday.

According to another refinement, a priority value defined by the advertiser is linked to each content. Because of this, the scheduling defined by the order of the identifiers is no longer a main criterion. The priority is used by the SCH module when the user rarely watches the transmissions and a choice needs to be made between two contents. According to a simplified embodiment, the contents are displayed one after the other: first STAR WAR1, then STAR WAR2, . . . and finally STAR WAR5, according to the order defined by the identifiers in the table. This simple mode is most suited to users who do not often watch the programs. The other users see the sequences in groups, for example, STAR WAR1 five times in succession, then STAR WAR2 five times, and so on. Such a user may be tired of always seeing the same sequences.

To overcome this drawback, the priority concept has associated with it a maximum number of occurrences per day. Below is an example of a block of data defining a scenario for displaying five audiovisual contents with priorities and maximum numbers of occurrences per day:

TABLE 6

(general data defining the advertising scenario)

| Content identifier | Display occurrences | Programmed display window | Priority of identified content |
|---|---|---|---|
| STAR WAR1 | 1 to 20 times 4/D max | 24/5, 25/5, 26/5, 27/5, 28/8, 29/5, 30/5 | 5 |
| STAR WAR2 | 1 to 6 times 3/D max | 27/5, 28/5, 29/5, 30/5 | 4 |
| STAR WAR3 | 1 to 4 times 2/D max | 29/5, 30/5 | 3 |
| STAR WAR4 | 2 times 2/D max | 30/5 | 1 |
| STAR WAR5 | 1 to 3 times 2/D max | 29/5, 30/5 | 2 |

According to table 6, STAR WAR4 has the highest priority and STAR WAR1 the lowest. Since the five contents are programmed for May 30, they are displayed in priority order and as many times as the maximum number of occurrences for that day. Below is the list of sequences displayed under the control of the SCH module:
  STAR WAR4 twice,
  STAR WAR5 twice,
  STAR WAR3 twice,
  STAR WAR2 3 times
  STAR WAR1 4 times It can be seen that, if the maximum number of occurrences per day has been reached, the SCH module switches to the next lower priority content. When the maximum number of occurrences is reached, the sequence will no longer be displayed. The advertiser must ensure that the maximum number per day multiplied by the number of days programmed is at least equal to that of the maximum number of occurrences of this sequence during the campaign. For example, if STAR WAR1 is programmed for a maximum 20, and can be displayed a maximum of four times per day over seven days: 20 is less than 28. Advantageously, the advertiser allows a margin for each receiver to be able to adapt to what the user actually does. Thus, the SCH module can anticipate by taking account of the habits of the user: if the user watches fairly little television at the end of the week, the SCH module decides to display the maximum of STAR WAR1 sequences at the start of the week, the twenty sequences during the first five days.

In the context of the present invention, it is understood that any refinement described previously and listed below:
  alternating display
  delayed display
  display by anticipating the habits of the user
  priority of sequences,
  definition of a maximum number of displays per day
can be added independently of each other to the basic scenario defined by the table. This makes the display method extremely adaptable to the behavior of the users.

We will now use an example to describe the actions carried out by the SCH module to adapt the displays of advertising sequences to the habits of a user.

Below is a table giving the optimal display desired by the advertiser ("STAR WARi" is abbreviated "SW i"):

| 24/5 | 25/5 | 26/5 | 27/5 | 28/5 | 29/5 | 30/5 |
|------|------|------|------|------|------|------|
| SW1  | SW1  | SW1  | SW2  | SW2  | SW5  | SW5  |
| SW1  | SW1  | SW1  | SW1  | SW1  | SW3  | SW4  |
| SW1  | SW1  | SW1  | SW2  | SW2  | SW2  | SW2  |
|      |      |      | SW1  | SW1  | SW1  | SW1  |
|      |      |      | SW1  | SW1  | SW3  | SW5  |
|      |      |      |      |      | SW1  | SW4  |
|      |      |      |      |      | SW1  | SW1  |
|      |      |      |      |      |      | SW4  |
|      |      |      |      |      |      | SW4  |

This display scenario must, however, take account of the user. Below is an example of what actually happens:

| 24/5 | 25/5 | 26/5 | 27/5 | 28/5 | 29/5 | 30/5 |
|------|------|------|------|------|------|------|
| SW1  | SW1  | SW1  | SW2  | SW2  | SW5  | SW5  |
| SW1  | SW1  | SW1  | SW1  | SW2  | SW5  | SW4  |
| SW1  | SW1  | SW1  | SW1  | SW2  | SW3  | SW4  |
| SW1  | SW1  | SW1  | SW1  | SW1  | SW3  | SW3  |
|      |      |      | SW1  | SW1  |      |      |
|      |      |      | SW1  | SW1  |      |      |
|      |      |      |      | SW1  |      |      |

It can be seen that the SCH module has anticipated the fact that on May 30, many sequences are programmed and the habits of the user will not enable them all to be displayed. Because of this, the SCH module has programmed the display of more of the sequence SW1 on the first days. At the end of the display of this scenario (on the evening of May 30), the context data associated with the usage of this scenario is:

TABLE 7

General data defining the advertising scenario

| Identifier | Programmed number of occurrences | Display window | Priority | Actual number of occurrences | Date/time of occurrences |
|---|---|---|---|---|---|
| STAR WAR1 | 1 to 20 times 4/D | 24/5, 25/5, 26/5, 27/5, 28/8, 29/5, 30/5 | 5 | 20 | 24/5, 24/5, 24/5, 24/5, 25/5, 25/5, 25/5, 25/5, 26/5, 26/5, 26/5, 26/5, 27/5, 27/5, 27/5, 27/5, 28/5, 28/5, 28/5, 28/5 |
| STAR WAR2 | 1 to 6 times 3/D | 28/5, 29/5, 30/5 | 4 | 4 | 28/5: 18:26, 28/5: 22:56, 28/5: 17:05, 30/5: 23:15 |
| STAR WAR3 | 1 to 4 times 2/D | 29/5, 30/5 | 3 | 3 | 29/5: 21:16, 29/5: 22:45, 30/5: 22:30 |
| STAR WAR4 | 2 times 2/D | 30/5 | 1 | 1 | 30/5: 19:15, 30/5: 20:30 |
| STAR WAR5 | 1 to 3 times 2/D | 29/5, 30/5 | 2 | 3 | 29/5: 15:45, 29/5: 18:30, 30/5: 21:40 |

It can be seen by analyzing the stored data that:

The STAR WAR1 content having the lowest priority was displayed 20 times in five days, at a rate of four times per day. Having reached its maximum number, the SCH module no longer selects it on the last two days (May 29 and May 30) when it could be displayed.

The STAR WAR2 content (priority 4) was displayed three times on May 28, which is the maximum per day, and only once on May 30. Its low priority relative to the other sequences did not allow the target maximum of six occurrences to be reached.

The STAR WAR3 content (priority 3) was displayed twice on May 29 and once on May 30.

The STAR WAR4 content (maximum priority 1) was displayed twice on the planned day. Given that this sequence has priority, reaching its target is almost certain.

The STAR WAR5 content (priority 2) was displayed twice on the first day (May 29), then a final time on the second day. The target of three displays is therefore met.

The STAR WAR 2 and STAR WAR 3 contents were displayed a number of occurrences less than the maximum. This is explained by the fact that many sequences are programmed on the last days of the campaign and that these sequences have a priority that is higher than those of STAR WAR 2 and STAR WAR 3. Since it is the last day, it is not possible to display on the following day the sequences that should have been displayed previously. This situation could have been avoided by using the anticipation-based display and taking into account the habits of the user. The SCH module would then have displayed STAR WAR2 and STAR WAR3 earlier, for example STAR WAR2 once on May 27 and STAR WAR3 once on May 28. The module managing the habits of the user will take account of this recent behavior of the user and, because of this, this problem may no longer subsequently appear.

This example shows the flexibility provided by the scenario blocks created by the advertiser and the accuracy that the SCH module can provide for the instructions given by the advertiser to be followed as closely as possible.

According to a refinement, when the advertising campaign is finished, that is, when the last time window indicated in the scenario is ended, the receiver transmits via the digital network 6, or more simply via a return channel, the actual campaign data. For this, it transmits the data from the "actual occurrences" and "date and time of occurrences" columns together with the content identifier. In this way, the broadcaster knows the number of sequences actually displayed to a user and, by transmitting this information to the advertiser, he can bill him for the number of sequences displayed. Advantageously, the first part of the context (associated with the habits of the user) is also transmitted, and in this way the advertiser can know the duration and the times of use of the receivers, and therefore the habits of the users and take them into account when creating new scenarios.

The exemplary embodiments of the invention described above were chosen for their concrete nature. It would not, however, be possible to exhaustively list all the embodiments covered by this invention. In particular, any step or any means described can be replaced by an equivalent step or means without departing from the spirit of the present invention.

The invention claimed is:

1. A method for displaying audiovisual sequences by a device provided with a means of receiving and recording said audiovisual sequences, and a generator of displaying signal, wherein it comprises the following steps executed by said device:
    receiving and recording in said device a display scenario comprising groups of data defining a plurality of time display windows, wherein, for each audiovisual sequence to display, said data combine at least one identifier of said audiovisual sequence with at least one time display window for displaying this audiovisual sequence;
    establishing a forecast time band usage calendar specifying when said device will be used for viewing the audiovisual sequences and when said device will not be used for viewing the audiovisual sequences by compiling usage data of said device in according with a user's habits of watching television;
    selecting at least one audiovisual sequence associated with a first time display window defined by the data included in the recorded display scenario, said first time display window falling into forecast time band usage calendar specifying when said device will not be used for viewing the audiovisual sequences;
    modifying the display scenario recorded in said device in order to display the at least one selected audiovisual sequence associated with the first time display window, during a second time display window falling into forecast time band usage calendar specifying when said device will be used for viewing the audiovisual sequences, such that the second time display window is before the first time display window, and such that a chronological order of the plurality of time display windows of the recorded display scenario is preserved; and
    following a reception of a trigger indication originating from a broadcast network, displaying each selected audiovisual sequence during the second time display window associated with the selected audiovisual sequence in the modified display scenario.

2. The method for displaying audiovisual sequences as claimed in claim 1, wherein it comprises a step for selecting at least one audiovisual sequence, the associated time display window of which corresponds to a present moment, the audiovisual sequence selection being repeated as long as a number of displays of said audiovisual sequence has not reached a maximum value, said value being transmitted in the display scenario.

3. The method for displaying audiovisual sequences as claimed in claim 2, wherein the time display windows are divided into a plurality of periods, and the associated audiovisual sequence no longer being displayed during a predetermined period when a maximum number of displays for this period is reached.

4. The method for displaying audiovisual sequences as claimed in claim 2, wherein a plurality of audiovisual sequences are associated with a maximum number of displays and at least one time display window, the audiovisual sequences of the plurality being alternately selected when the associated time display window includes the present moment and if the maximum number of displays has not been reached.

5. The method for displaying audiovisual sequences as claimed in claim 4, wherein an order for displaying the associated audiovisual sequences is defined randomly.

6. The method for displaying audiovisual sequences as claimed in claim 1, wherein a priority value is associated with the audiovisual sequences, the audiovisual sequence having the highest priority being selected and displayed first.

7. The method for displaying audiovisual sequences as claimed in claim 1, wherein an audiovisual sequence can be selected and displayed after a time display window indicated in the display scenario if a number of displays of this sequence has not reached a minimum value.

8. The method for displaying audiovisual sequences as claimed in claim 1, wherein a number of displays of each audiovisual sequence is transmitted outside the device when the last time display window defined in the display scenario is ended.

9. The method for displaying audiovisual sequences as claimed in claim 1, wherein it includes a step for introducing a user identifier, the selection of the audiovisual sequences being performed independently for each user.

10. A receiver of audiovisual transmissions comprising a means of receiving audiovisual sequences such as advertising sequences, a memory, a means of sending display signals, wherein it comprises:
    a means of receiving a display scenario comprising groups of data defining a plurality of time display windows, wherein, for each audiovisual sequence to display, said data combine at least one identifier of said audiovisual sequence with at least one time display window for displaying this audiovisual sequence, the received display scenario being recorded in the memory of the receiver;
    a means of establishing a forecast time band usage calendar specifying when said device will be used for viewing the audiovisual sequences and when said device will not be used for viewing the audiovisual sequences by compiling usage data of said device in according with a user's habits of watching television;
    a means of selecting at least one audiovisual sequence associated with a first time display window defined by the data included in the recorded display scenario, said first time display window falling into forecast time band usage calendar specifying when said device will not be used for viewing the audiovisual sequences;
    a means for modifying the recorded display scenario in order to display the at least one selected audiovisual sequence associated with the first time display window, during a second time display window falling into forecast time band usage calendar specifying when said device will be used for viewing the audiovisual sequences, such that the second time display window is before the first time display window, and such that a chronological order of the plurality of time display windows of the recorded display scenario is preserved; and
    a means for displaying each selected audiovisual sequence activated following a reception of a sequence display trigger indication originating from a broadcast network, the selected audiovisual sequences associated with the first time display window in the recorded display scenario being displayed during the second time window associated with the selected audiovisual sequences in the modified display scenario.

11. The receiver of audiovisual transmissions as claimed in claim 10, wherein the selection means also selects at least one audiovisual sequence for which the associated time display windows corresponds to the present moment.

12. The receiver of audiovisual transmissions as claimed in claim 10, wherein the received display scenario contains a maximum number of displays associated with at least one audiovisual sequence, the receiver comprising a means of counting number of displays of at least one audiovisual sequence, the audiovisual sequence selection being repeated as long as the number of displays of said audiovisual sequence has not reached a maximum value.

13. The receiver (1) of audiovisual transmissions as claimed in claim 10, wherein the received display scenario contains a maximum number of displays associated with a plurality of audiovisual sequences, the selection means alternately selecting each audiovisual sequence when the associated time window includes a present moment and if a maximum number of displays has not been reached.

14. The receiver of audiovisual transmissions as claimed in claim 10, wherein the received display scenario contains a priority value associated with at least one audiovisual sequence, the selection means giving priority to the selection of the audiovisual sequences with the highest value.

15. The receiver of audiovisual transmissions as claimed in claim 10, wherein the selection means selects an audiovisual sequence after the time display window indicated in the display scenario if a number of displays of this audiovisual sequence has not reached a minimum value.

16. The receiver of audiovisual transmissions as claimed in claim 10, wherein it includes a means of transmitting outside the receiver at least a number of displays of each audiovisual sequence.

17. The receiver of audiovisual transmissions as claimed in claim 10, wherein it includes a means of introducing a user identifier, the selection of the audiovisual sequences being performed independently for each user.

* * * * *